US011636380B2

United States Patent
Van Vredendaal et al.

(10) Patent No.: US 11,636,380 B2
(45) Date of Patent: Apr. 25, 2023

(54) METHOD FOR PROTECTING A MACHINE LEARNING MODEL AGAINST EXTRACTION USING AN ENSEMBLE OF A PLURALITY OF MACHINE LEARNING MODELS

(71) Applicant: NXP B.V., Eindhoven (NL)

(72) Inventors: Christine Van Vredendaal, Eindhoven (NL); Nikita Veshchikov, Brussels (BE); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 971 days.

(21) Appl. No.: 16/378,942

(22) Filed: Apr. 9, 2019

(65) Prior Publication Data

US 2020/0327443 A1 Oct. 15, 2020

(51) Int. Cl.
*G06N 20/00* (2019.01)
*G06F 7/58* (2006.01)
(Continued)

(52) U.S. Cl.
CPC .............. *G06N 20/00* (2019.01); *G06F 7/582* (2013.01); *G06N 3/08* (2013.01); *G06N 20/20* (2019.01)

(58) Field of Classification Search
CPC .......... G06N 20/00; G06N 20/20; G06N 3/08; G06N 3/0454; G06F 21/554; G06F 7/582
See application file for complete search history.

(56) References Cited

U.S. PATENT DOCUMENTS 6,874,025 B2 3/2005 Hoogenboom et al.
7,200,599 B2 4/2007 Simon et al.
(Continued)

FOREIGN PATENT DOCUMENTS

CN 103246738 A 8/2013
CN 103310139 A 9/2013
(Continued)

OTHER PUBLICATIONS

Donahue, Jeff et al.; "DeCAF: A Deep Convolutional Activation Feature for Generic Visual Recognition;" arXiv.org > cs > arXiv:1310.1531; Oct. 6, 2013.
(Continued)

*Primary Examiner* — Pakee Fang
(74) *Attorney, Agent, or Firm* — Daniel D. Hill (57) ABSTRACT

A method for protecting a machine learning model is provided. In the method, a first machine learning model is trained, and a plurality of machine learning models derived from the first machine learning model is trained. Each of the plurality of machine learning models may be different from the first machine learning model. During inference operation, a first input sample is provided to the first machine learning model and to each of the plurality of machine learning models. The first machine learning model generates a first output and the plurality of machine learning models generates a plurality of second outputs. The plurality of second outputs are aggregated to determine a final output. The final output and the first output are classified to determine if the first input sample is an adversarial input. If it is adversarial input, a randomly generated output is provided instead of the first output.

19 Claims, 3 Drawing Sheets

(51) Int. Cl.
*G06N 3/08* (2023.01)
*G06N 20/20* (2019.01)

(56) References Cited

U.S. PATENT DOCUMENTS

| | | | |
|---|---|---|---|
| 9,558,445 | B1 | 1/2017 | Rabe et al. |
| 2003/0037236 | A1 | 2/2003 | Simon et al. |
| 2009/0019313 | A1 | 1/2009 | Pokala et al. |
| 2015/0161522 | A1* | 6/2015 | Saon ............... G06N 3/08 706/12 |
| 2018/0308012 | A1* | 10/2018 | Mummadi ........... G06N 3/0454 |
| 2019/0156183 | A1* | 5/2019 | Durham ............. G06N 3/0472 |
| 2019/0171929 | A1* | 6/2019 | Abadi .................. G06N 3/084 |
| 2019/0362269 | A1* | 11/2019 | Barad .................. G06F 21/554 |
| 2020/0167471 | A1* | 5/2020 | Rouhani .............. G06N 7/005 |

FOREIGN PATENT DOCUMENTS

| | | |
|---|---|---|
| CN | 103701600 A | 4/2014 |
| CN | 107169574 A | 9/2017 |
| CN | 107730154 A | 2/2018 |
| JP | 4773204 B2 | 9/2011 |

OTHER PUBLICATIONS

Juuti, Mika et al.; "PRADA: Protecting Against DNN Model Stealing Attacks;" CoRR abs/1805.02628 (2018).

Kauffmann, Jacob et al.; "Towards Explaining Anomalies: A Deep Taylor Decomposition of One-Class Models;" arXiv.org > stat > arXiv: 1805.06230; May 16, 2018.

Lee, Taesung et al.; "Defending Against Machine Learning Model Stealing Attacks Using Deceptive Perturbations;" CoRR abs/1806.00054 (2018).

Rouhani, Bita Darvish et al.; "CuRTAIL: ChaRacterizing and Thwarting Adversarial deep Learning;" CoRR abs/1709.02538 (2017).

Tramèr, Florian et al.; "Stealing Machine Learning Models Via Prediction APIs;" 25th USENIX Security Symposium; Aug. 10-12, 2016, Austin, TX, USA.

Xu, Weilin et al.; "Feature Squeezing: Detecting Adversarial Examples In Deep Neural Networks;" arXiv.org > cs > arXiv:1704.01155; Dec. 5, 2017.

Grosse, Kathrin et al.; "On the (Statistical) Detection of Adversarial Examples;" arXiv.org > cs > arXiv:1702.06280; Submitted Feb. 21, 2017, Last revised Oct. 17, 2017.

Meng, Dongyu et al.; "MagNet: a Two-Pronged Defense against Adversarial Examples;" arXiv.org > cs > arXiv:1705.09064; Submitted May 25, 2017, Last revised Sep. 11, 2017; Accepted at the ACM Conference on Computer and Communications Security (CCS), Oct. 30-Nov. 3, 2017, Dallas, Texas.

Smutz, Charles et al.; "When a Tree Falls: Using Diversity in Ensemble Classifiers to Identify Evasion in Malware Detectors;" Network and Distributed System Security Symposium (NDSS), Feb. 21-24, 2016, San Diego, California; DOI:10.14722/NDSS.2016.23078.

Strauss, Thilo et al.; "Ensemble Methods as a Defense to Adversarial Perturbations Against Deep Neural Networks;" arXiv.org > stat > arXiv: 1709.03423; Submitted Sep. 11, 2017, Last revised Feb. 8, 2018.

Yuan, Xiaoyong et al.; "Adversarial Examples: Attacks and Defenses for Deep Learning;" arXiv.org > cs > arXiv:1712.07107; Submitted Dec. 19, 2017, Last revised Jul. 7, 2018.

\* cited by examiner

METHOD FOR PROTECTING A MACHINE LEARNING MODEL AGAINST EXTRACTION USING AN ENSEMBLE OF A PLURALITY OF MACHINE LEARNING MODELS

BACKGROUND

Field

This disclosure relates generally to machine learning, and more particularly, to a method for protecting a machine learning model against extraction.

Related Art

Machine learning is used to approximate functions that cannot be derived analytically. Machine learning is typically used to approximate functions such as forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for compiling a representative training set of data, labelling the data results in the training data, and the ML model obtained from the training data are valuable assets.

Protecting a ML model from attacks has become a problem. When ML is provided as a service, a user only has access to the inputs and outputs of the ML model. Model extraction is an attack that results in a near identical copy of the ML model being produced. When ML is provided as a service, an attacker may only have access to the inputs and outputs of the ML model. To extract the model when the ML model is provided as a service, valid queries are provided to the model and the resulting output is compiled. An attacker does not have to provide problem-domain (PD) inputs to the model. An attacker can also copy the model using non-problem-domain (NPD) inputs. Even when an attacker is just given access to the inputs and outputs, the ML model can be relatively easily copied. Once an attacker has copied the model, it can be illegitimately used and monetized. Also, an adversary can apply model extraction to gain white-box access and thereby develop other attacks, such as attacks that can fool the original model to mis-predict.

Therefore, a need exists for a way to protect a ML model against extraction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for protecting a ML model against extraction. In one embodiment, a ML model is provided to generate an output in response to receiving an input sample. The input sample may be an image and the output may be a classification of the image. The ML model may be trained to provide a correct classification for a normal-type of input sample with relatively high reliability. A normal-type of input sample (problem domain) may be an input sample that might be input by a legitimate user making use of the ML model in a way the model was intended to be used. A potentially adversarial-type of input sample (non-problem domain) may be from, for example, samples that are randomly chosen or unrelated to the intended use of the ML model. To prevent an attacker from cloning, or making an illegitimate copy, of the trained ML model, it is important to be able to detect and differentiate a normal-type of input sample from an adversarial-type of input sample. To detect an adversarial-type of input sample, in one embodiment, a plurality of additional ML models is derived from the ML model to be protected but have differences from the ML model. Also, the plurality of additional ML models may be trained to have similar accuracy as the protected ML model when provided with problem domain input samples. However, the plurality of additional ML models may be trained to have a reduced accuracy. In either case, each of the plurality of additional ML models is trained to have a different behavior when provided with non-problem domain input samples. An aggregator and distinguisher are connected to the outputs of the plurality of ML models. The aggregator determines a final output from the outputs of the plurality of ML models. The distinguisher is connected to the outputs of the plurality of additional ML models and the received input to detect and classify the input sample as PD or NPD. In response to detecting a NPD input sample, the ML system may return a random output instead of a correct PD output. To prevent an attacker from learning that random outputs are being returned instead of the real outputs, the random outputs may be "smoothed" so that a difference in the values of generated consecutive random outputs is reduced. This prevent the random outputs from being wildly different from one random output to the next and thus alerting an attacker.

By using a plurality of additional ML models as described herein, a trained ML model is protected from extraction, or cloning, by an attacker without significantly impacting the functioning of the protected ML model for problem domain input samples. Also, the ML model does not require ML model architecture changes to provide the protection. In addition, no retraining of the ML model is required. Constructing the plurality of additional ML models to have a reduced accuracy provides a reduction in effort, time, and cost to construct the plurality of ML models.

In accordance with an embodiment, there is provided, a method including: training a first machine learning model with a first data set to provide a first output having a first accuracy; training a plurality of machine learning models, each of the plurality of machine learning models derived from the first machine learning model, wherein the plurality of machine learning models each having a predetermined difference from the first machine learning model; providing, during inference operation, a first input sample to the first machine learning model and to each of the plurality of machine learning models, wherein in response to receiving the first input sample, the first machine learning model providing a first output and the plurality of machine learning models provides a plurality of second outputs; aggregating the plurality of second outputs to determine a final output; and classifying the final output, if the first input sample is in a problem domain and the first output and the final output are in the problem domain, the first input sample is determined to not be an adversarial input sample, and if the first input sample is not in the problem domain, the first output is in the problem domain, and the final output is not in the problem domain, the first input sample is identified as being an adversarial input. Aggregating the plurality of outputs may further include determining the final output is decided by a majority vote of the plurality of machine learning models. Aggregating the plurality of outputs may further include aggregating the plurality of outputs using a weighted sum of the plurality of outputs. Training the first machine learning model and training the plurality of machine learning models may occur concurrently, and the first machine learning model and the plurality of machine learning models may be trained using different training input samples. Each of the plurality of machine learning models may be trained to provide a second output having a second accuracy in response to receiving the first input, and wherein the second accuracy may be lower than the first accuracy. The plurality of machine learning models may further include a plurality of clones of the first machine learning model, and wherein training the plurality of machine learning models may further include retraining the plurality of clones of the first machine learning model to have a second accuracy, and wherein the second accuracy may be lower than the first accuracy. Classifying the final output may further include detecting that the first input sample is an adversarial input sample, and in response, generating a pseudo-random output to provide instead of the first output. The method may further include smoothing the pseudo-random output to reduce a difference in values between consecutive pseudo-random outputs. The training of the plurality of machine learning models may further include training the plurality of machine learning models using a data set used to train the first machine learning model.

In another embodiment, there is provided, a method for protecting a first machine learning model, the method including: providing to a first machine learning model a first input sample during an inference operation of the first machine learning model; generating a first output from the first machine learning model in response to the first input sample; determining if the first input sample is an adversarial input; if the first input is determined to be an adversarial input, generating a random output value; smoothing the random output value to reduce a difference between the random output value and the first output from the first machine learning model; and providing the smoothed random output value instead of the first output. Determining if the first input sample is an adversarial input may further include: training a plurality of machine learning models, each of the plurality of machine learning models derived from the first machine learning model, wherein the plurality of machine learning models may each have a predetermined difference from the first machine learning model; providing a plurality of second outputs from the plurality of machine learning models; aggregating the plurality of second outputs to determine a final output; and classifying the final output to determine if the first input sample is an adversarial input, wherein if the first input sample is in a problem domain and the first output and the final output are in the problem domain, the first input sample may be determined to not be an adversarial input, and if the first input sample is not in the problem domain, the first output is in the problem domain, and the final output is not in the problem domain, the first input sample may be identified as being an adversarial input. Aggregating the plurality of outputs may further include determining that the final output is decided by a majority vote of the plurality of machine learning models. The method may further include training the first machine learning model, wherein training the plurality of machine learning models and the first machine learning model occurs concurrently, and wherein the first machine learning model and the plurality of machine learning models may be trained using different training input samples. Training the plurality of machine learning models may further include training the plurality of machine learning models using a data set used to train the first machine learning model. The random output value may be pseudo-randomly generated.

In yet another embodiment, there is provided, a non-transitory machine-readable storage medium encoded with instructions for hardening a machine learning model against extraction, including: instructions for training a first machine learning model with a first data set to provide a first output having a first accuracy; instructions for training a plurality of machine learning models, each of the plurality of machine learning models derived from the first machine learning model, wherein the plurality of machine learning models each having a predetermined difference from the first machine learning model; instructions for providing, during inference operation, a first input sample to the first machine learning model and to each of the plurality of machine learning models, wherein in response to receiving the first input sample, the first machine learning model providing a first output and the plurality of machine learning models providing a plurality of second outputs; instructions for aggregating the plurality of second outputs to determine a final output; instructions for classifying the final output and the first output to determine if the first input sample is identified as being an adversarial input; and instructions for providing a randomly generated output if the first input sample is identified as being an adversarial input, otherwise providing the first output. Aggregating the plurality of outputs may further include determining that the final output is decided by a majority vote of the plurality of machine learning models. Classifying the final output to the first output may further include comparing the final output to the first output, if the first input sample is in a problem domain and the first output and the final output are in the problem domain, the first input sample may be determined to not be an adversarial input sample, and if the first input sample is not in the problem domain, the first output is in the problem domain, and the final output is not in the problem domain, the first input sample may be identified as being an adversarial input. Training the first machine learning model and training the plurality of machine learning models may occur concurrently, and wherein the first machine learning model and the plurality of machine learning models may be trained using different training input samples. The randomly generated output may be pseudo-randomly generated, and the method further may include smoothing the pseudo-randomly generated output to reduce a difference in values between consecutive randomly generated outputs.

Figure 1:
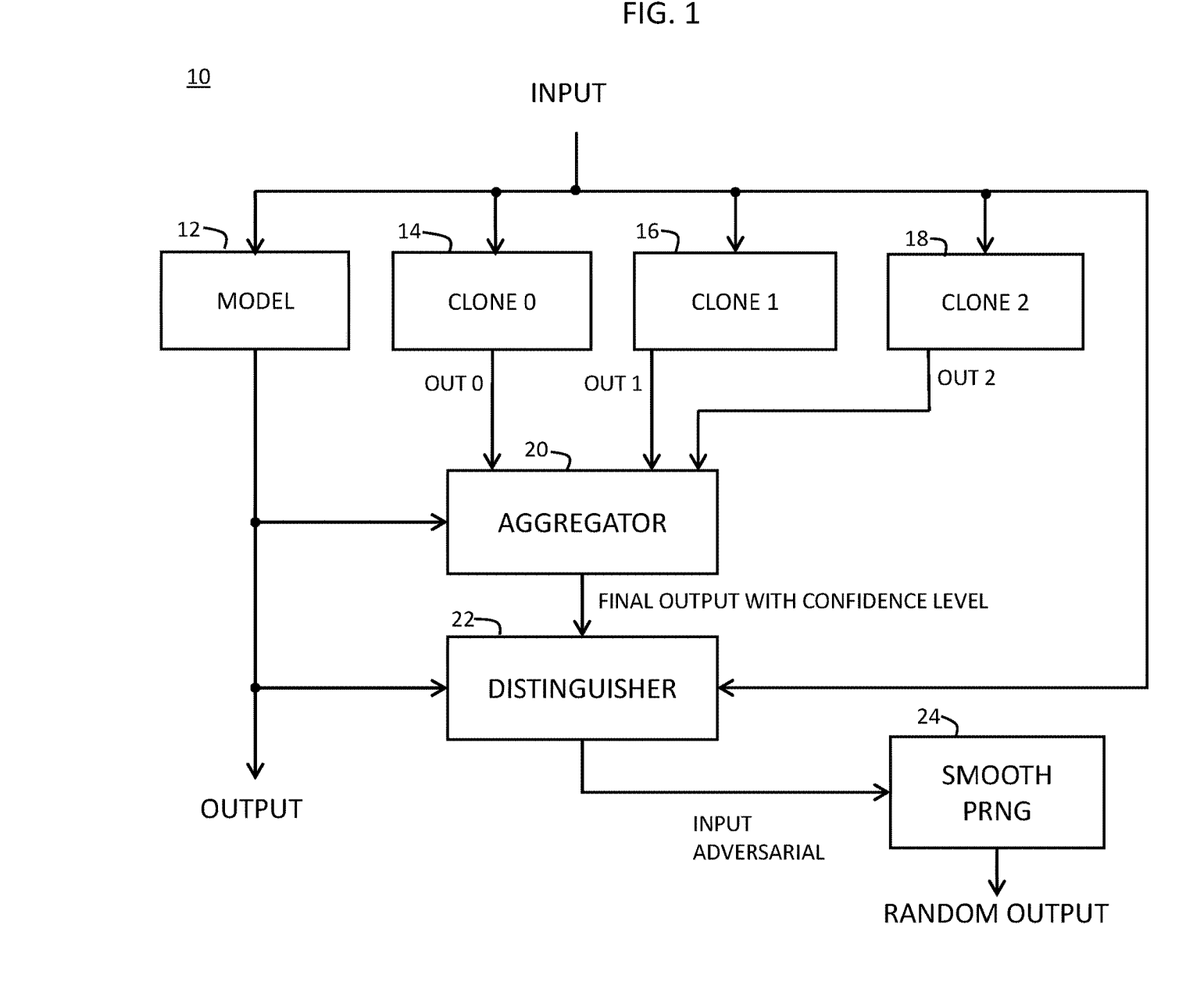
FIG. 1 illustrates a ML model in accordance with an embodiment.

FIG. 1 illustrates ML system 10 in accordance with an embodiment. Machine learning system 10 includes ML model 12, a plurality of ML models represented by ML models 14, 16, and 18, aggregator 20, distinguisher 22, and random number generator 24. Machine learning model 12 may be any type of ML model architecture for implementation in many possible applications. For example, ML model 12 may include a neural network architecture running a neural network application with a training data set to classify images. For example, ML model 12 may be implemented in a self-driving car for identifying road signs.

Machine learning model 12 is trained using a training data set. Machine learning model 12 may be trained to provide a correct classification for a normal-type of input sample with relatively high reliability and accuracy depending on the training data, the type of ML model, and the care with which the model is trained. Training data is available from various sources. For example, the MNIST training dataset, is a subset of a larger database provided by the National Institute of Standards and Technology (NIST). The MNIST includes 70,000 black and white images of handwritten digits, each represented by a 28×28 pixel bounding box (viewed as an array of size 784), where each pixel is encoded by a byte representing the corresponding gray level (i.e., an integer in the range of 0 to 255. A valid sample can be represented by a vector with 28×28=784 features, where each feature is an integer in the range of 0 to 255.

After training with the training data set, the trained machine learning model can be used to make predictions about similar input samples during inference operation. Training a ML model with a relatively good training data set to produce a quality trained machine learning model can be expensive. Because of the costs and expertise necessary to train a model, machine learning as a service (MLaaS) has become common. Machine learning as a service is generally part of a cloud-based computing service provided for a fee. In the case of MLaaS, users only have access to the input and output samples that are provided to and received from the machine learning model. Because a machine learning model can be extracted using only the inputs to the model and the resulting outputs, it has become necessary to harden, or protect, the ML model against extraction.

The plurality of ML models 14, 16, and 18 may be derived, or cloned, from ML model 12. In one embodiment, each of the plurality of ML models 14, 16, and 18 are modified to have a predetermined difference from ML model 12. The differences may be relatively small and allow the plurality of ML models to provide the correct output to PD input samples but will behave differently than ML model 12 for NPD input samples and will provide an NPD output in response to an NPD input sample. In one embodiment, the plurality of ML models may have a lower accuracy than ML model 12, but high enough accuracy that the plurality of ML models will reach the correct result most of the time. Providing the plurality of ML models with a lower accuracy reduces the requirements to build the plurality of ML models while providing similar results as ML model 12 for PD input samples. There are many ways to cause the plurality of ML models 14, 16, and 18 to be different from ML model 12. For example, ML models 14, 16, and 18 may be trained using different training data than that used for ML model 12. Also, ML models 14, 16, and 18 may be trained to provide a different accuracy, or confidence, than ML model 12 on the same input samples.

The plurality of ML models 14, 16, and 18 may be trained concurrently with the training of ML model 12, or they may be copied from ML model 12 and re-trained using additional training data. The plurality of ML models may be re-trained to provide the lower accuracy. During inference operation, the plurality of ML models 14, 16, and 18 receives the same input sample INPUT as ML model 12, and each of the plurality of ML models 14, 16, and 18 provides an output prediction labeled OUT 0, OUT 1, and OUT 2, respectively, to aggregator 20. FIG. 1 illustrates the plurality of ML models including 3 ML models. In other embodiments, the number of ML models used to detect NPD input samples may be different.

As noted above, input samples can be categorized, or classified, as problem domain (PD) inputs or non-problem domain (NPD) inputs. A normal-type of input sample (problem domain) may be an input sample that is input by a legitimate user making use of the ML model in a way the model was intended to be used. A potentially adversarial-type of input sample (non-problem domain) may be, for example, samples that are randomly chosen or unrelated to the intended use of the ML model. The ML model may attempt to classify a NPD input in the PD, but with low accuracy and confidence.

In some ML models, an output prediction is provided with a confidence level to indicate the degree to which the output is accurate. Typically, the confidence levels are provided as percentages. There are a number of ways to generate the confidence levels. In one embodiment, a confidence level of an output is computed based on a weighted sum of the inputs and the outputs communicated with the model.

Aggregator 20 receives all the individual predictions from the plurality of ML models, and based on a predetermined criterion, provides a final aggregated output with a confidence level labeled "FINAL OUTPUT WITH CONFIDENCE LEVEL." For example, the final output may be determined based on the output provided by a majority of the ML models. Also, the outputs may be weighted, so that a weighted sum approach may be used to provide the FINAL OUTPUT. As another example, the final output may depend on the number of outputs of the plurality of ML models 14, 16, and 18 that agree with the output of ML model 12. Also, the statistical variance of the output provided by the ML models may decide the final output. A combination of these examples may also be used. The final output is then provided to distinguisher 22.

Distinguisher 22 receives the final output from the plurality of ML models, the output signal OUTPUT from ML model 12, and the input sample INPUT, and determines if the INPUT sample is likely to be an adversarial input by classifying the INPUT sample, the FINAL OUTPUT, and the OUTPUT. For example, if the input sample INPUT is in the PD and OUTPUT and FINAL OUTPUT are also in the PD, then the INPUT is likely not an adversarial input and the normal OUTPUT from ML model 12 is provided in response to the INPUT. However, if input sample INPUT is classified as NPD, but output signal OUTPUT is in the PD and FINAL OUTPUT is NPD, then the input sample INPUT is likely to be an adversarial input. When the plurality of ML models 14, 16, and 18 detects that an NPD input has been received, they are trained to provide an output that is different than the output provided by ML model 12.

When distinguisher 22 determines that the input sample is adversarial, then signal INPUT ADVERSARIAL is provided to smooth pseudo-random number generator (PRNG) 24. Smooth PRNG 24 will then provide a random number output labeled "RANDOM OUTPUT" in place of the normal OUTPUT from ML model 12. By being smoothed, smooth PRNG 24 provides a random output that has been adjusted so that the random output is not radically different from the previous output. By smoothing the random output in this manner, an attacker may not be alerted that random outputs are being provided instead of the read outputs. Described another way, pseudo-random number generator F is smooth if there exists a constant C, such that for all k the following is true: There exists a $\epsilon_k > 0$, such that for all inputs $x_0, x_1, \ldots, x_{k-1}$ with $|x_i - x_j| < \epsilon_k$, $x_i < x_{i+1}$ and $0 \leq i < j < k$, we have that $\Sigma_{i=0}^{k-1} F(x_i) < C \cdot \Delta$, where F is a pseudo-random number generator, F(x) is an PRNG output, k is the number of input samples, x is an input sample, $\Delta$ is a difference between a minimum F(x) and a maximum F(x), and C defines a maximum.

Smooth PRNG 24 may be implemented in many ways. In one example, an input space is split into numbered intervals and an ordinary pseudo-random number generated is applied to the interval number. This means that changing the input only modifies the output in the cases where the change moves the input to a different interval. Smooth PRNG 24 can also be implemented using, for example, a hash-function, a strongly fluctuating mathematical function like sine or cosine with a small period, or a neural network having randomly assigned weights.

By using plurality of ML models 14, 16, and 18 as described herein, ML model 12 is protected from extraction, or cloning, by an attacker without significantly impacting the functioning of the protected ML model for problem domain input samples. Also, ML model 12 does not require ML model architecture changes to provide the protection. In addition, no retraining of ML model 12 is required. Constructing the plurality of ML models 14, 16, and 18 to have a reduced accuracy provides a reduction in effort, time, and cost to construct the plurality of ML models.

Figure 2:
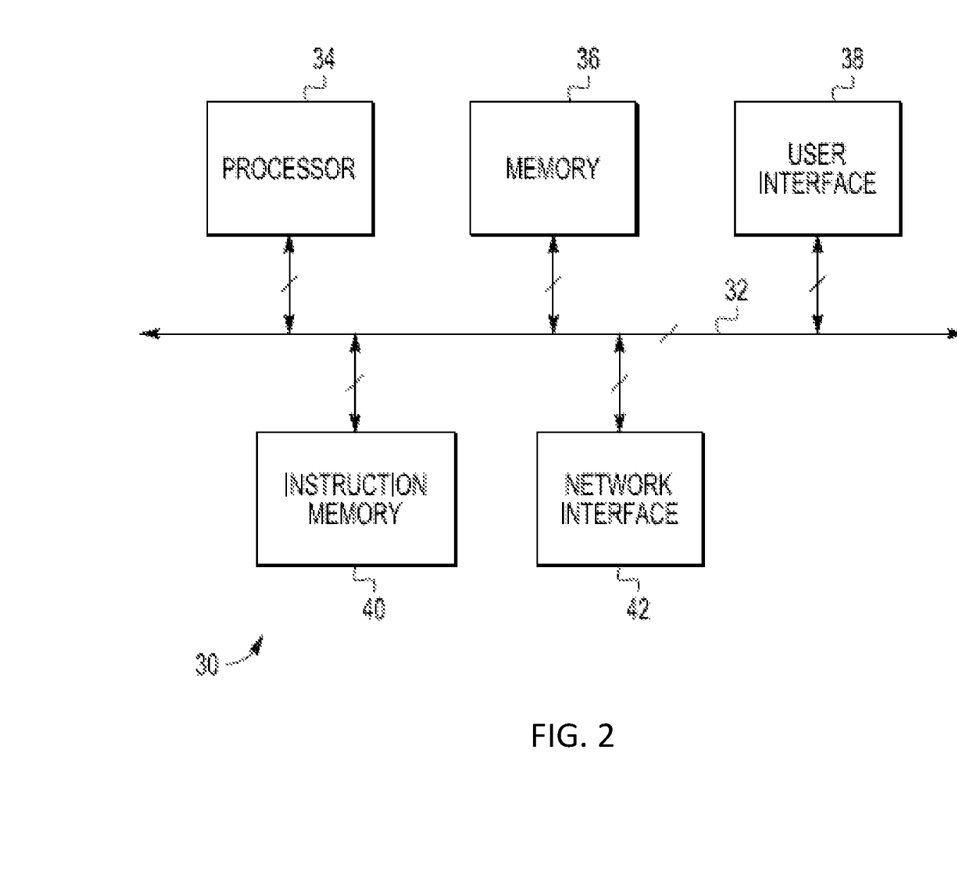
FIG. 2 illustrates a data processing system useful for implementing the machine learning model of FIG. 1.

FIG. 2 illustrates a data processing system 30 useful for implementing the machine learning model of FIG. 1. Data processing system 30 may be implemented on one or more integrated circuits and may be used in an implementation of the machine learning ensemble. Data processing system 30 includes bus 32. Connected to bus 32 is processor 34, memory 36, user interface 38, instruction memory 40, and network interface 42. Processor 34 may be any hardware device capable of executing instructions stored in memory 36 or instruction memory 40. For example, processor 34 may execute the machine learning algorithms using training data stored in memory 36. Processor 34 may have multiple processing cores. Processor 34 may be, for example, a microprocessor, field programmable gate array (FPGA), application-specific integrated circuit (ASIC), or similar device. Processor 34 may be implemented in a secure hardware element and may be tamper resistant.

Memory 36 may be any kind of memory, such as for example, L1, L2, or L3 cache or system memory. Memory 36 may include volatile memory such as static random-access memory (SRAM) or dynamic RAM (DRAM), or may include non-volatile memory such as flash memory, read only memory (ROM), or other volatile or non-volatile memory. Also, memory 36 may be implemented in a secure hardware element. Alternately, memory 36 may be a hard drive implemented externally to data processing system 30. In one embodiment, memory 36 is used to store training data 10.

User interface 38 may be connected to one or more devices for enabling communication with a user such as an administrator. For example, user interface 38 may be enabled for coupling to a display, a mouse, a keyboard, or other input/output device. Network interface 42 may include one or more devices for enabling communication with other hardware devices. For example, network interface 42 may include, or be coupled to, a network interface card (NIC) configured to communicate according to the Ethernet protocol. Also, network interface 42 may implement a TCP/IP stack for communication according to the TCP/IP protocols. Various other hardware or configurations for communicating are available.

Instruction memory 40 may include one or more machine-readable storage media for storing instructions for execution by processor 34, such as an implementation of the described embodiments. In other embodiments, both memories 36 and 40 may also store data upon which processor 34 may operate. Memories 36 and 40 may store, for example, one or more machine learning models, training data, or encryption, decryption, and verification applications. Memory 40 may be implemented in a secure hardware element and be tamper resistant.

Figure 3:
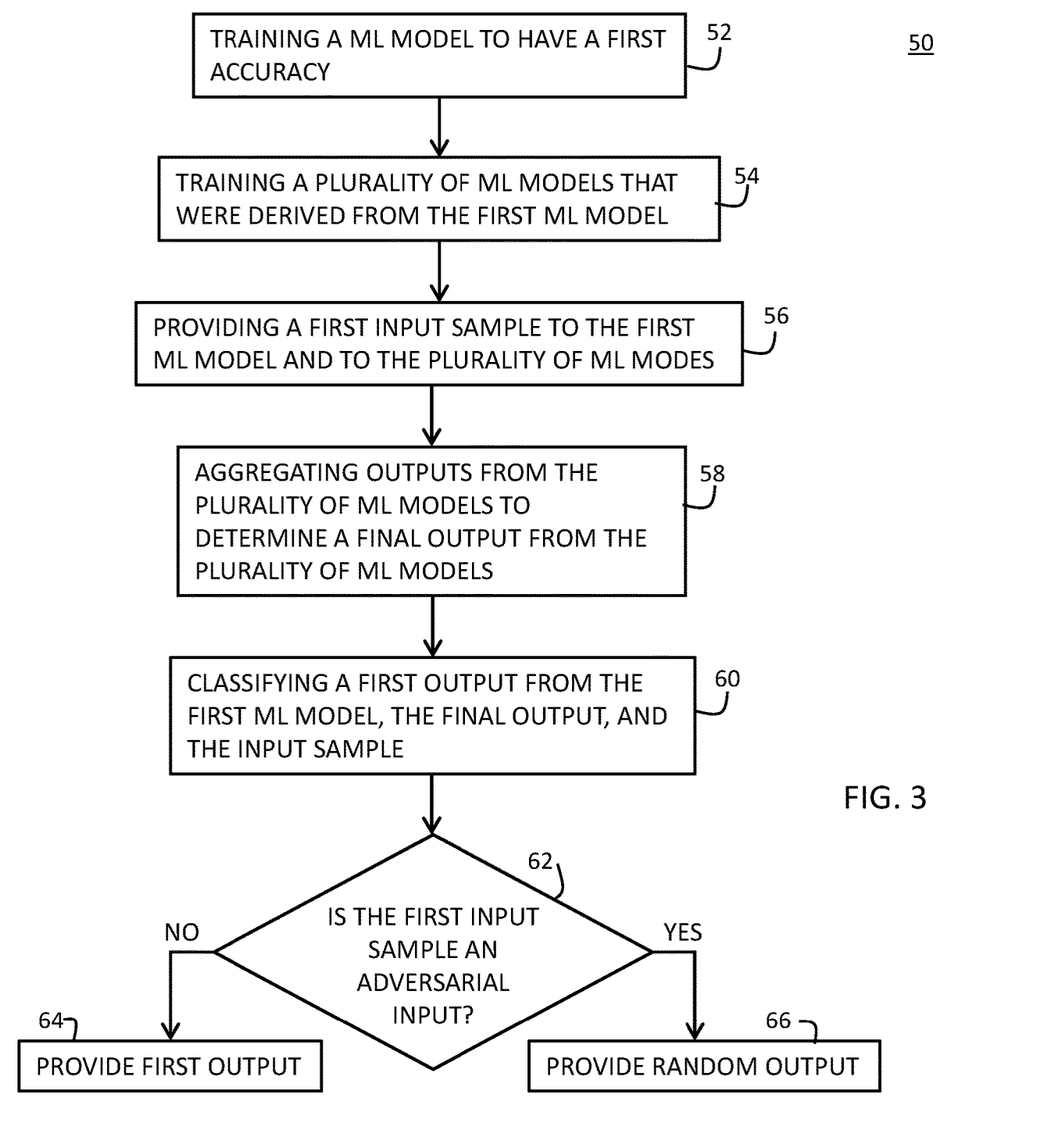
FIG. 3 illustrates a method for protecting a machine learning model against extraction in accordance with an embodiment.

FIG. 3 illustrates method 50 for protecting a machine learning model against extraction in accordance with an embodiment. Method 50 starts at step 52. At step 52, ML model 12 is trained with a training data set to have a first accuracy. At step 54, a plurality of ML models 14, 16, and 18 are derived from ML model 12 and trained. The data set used from training the plurality of ML models may be the same or different than the training set for ML model 12. The plurality of models may be trained concurrently with ML model 12 or may be retrained with different training sets than the data set used to train ML model 12. At step 56, during inference operation, a first input sample is provided to ML model 12 and to the plurality of ML models. In response, ML model 12 generates a first output and each of the plurality of ML models generates an output. At step 58, the outputs from the plurality of ML models are aggregated as illustrated in FIG. 1 by aggregator 20 to produce a final output. At step 60, distinguisher 22 (FIG. 1) compares the first output with the final output. If the input sample is in the PD and the first output and final output are also in the PD, then input sample is not an adversarial input. If the input sample is not in the PD, the first output is in the PD, and the final output is NPD, then the input sample is determined to be an adversarial input. At decision step 62, it is determined from the comparison of step 60 if the first input sample is an adversarial input or not. If the first input sample is not an adversarial input, the NO path is taken to step 64 and ML model 12 is allowed to provide an output in response to the input sample. However, if the first input sample is determined to be an adversarial input, the YES path is taken to step 66 and a pseudo-randomly generated output is provided instead of the output from ML model 12. Providing an attacker with a randomly generated output makes it more difficult, and therefore less likely that an attacker will be able to accurately duplicate the machine learning model.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
    training a first machine learning model with a first data set to provide a first output having a first accuracy;
    training a plurality of machine learning models, each of the plurality of machine learning models derived from the first machine learning model, wherein the plurality of machine learning models each having a predetermined difference from the first machine learning model;
    providing, during inference operation, a first input sample to the first machine learning model and to each of the plurality of machine learning models, wherein in response to receiving the first input sample, the first machine learning model providing a first output and the plurality of machine learning models provides a plurality of second outputs;
    aggregating the plurality of second outputs to determine a final output;
    classifying, with a distinguisher, each of the first output and the final output as problem domain or non-problem domain; and
    wherein if the first input sample is in the problem domain and the first output and the final output are in the problem domain, the first input sample is determined to not be an adversarial input sample, and if the first input sample is not in the problem domain, the first output is in the problem domain, and the final output is not in the problem domain, the first input sample is identified as being an adversarial input, and wherein if the first input sample is identified as being an adversarial input, providing a pseudo-random output instead of providing the first output.

2. The method of claim 1, wherein aggregating the plurality of outputs further comprises determining the final output is decided by a majority vote of the plurality of machine learning models.

3. The method of claim 1, wherein aggregating the plurality of outputs further comprises aggregating the plurality of outputs using a weighted sum of the plurality of outputs.

4. The method of claim 1, wherein training the first machine learning model and training the plurality of machine learning models occurs concurrently, and wherein the first machine learning model and the plurality of machine learning models are trained using different training input samples.

5. The method of claim 4, wherein each of the plurality of machine learning models is trained to provide a second output having a second accuracy in response to receiving the first input, and wherein the second accuracy is lower than the first accuracy.

6. The method of claim 1, wherein the plurality of machine learning models further comprises a plurality of clones of the first machine learning model, and wherein training the plurality of machine learning models further comprises retraining the plurality of clones of the first machine learning model to have a second accuracy, and wherein the second accuracy is lower than the first accuracy.

7. The method of claim 1, further comprising smoothing the pseudo-random output to reduce a difference in values between consecutive pseudo-random outputs.

8. The method of claim 1, wherein the training of the plurality of machine learning models further comprises training the plurality of machine learning models using a data set used to train the first machine learning model.

9. A method for protecting a first machine learning model, the method comprising:
    providing to a first machine learning model a first input sample during an inference operation of the first machine learning model;
    generating a first output from the first machine learning model in response to the first input sample;
    determining, with a distinguisher, if the first input sample is an adversarial input by determining if the first output is in a problem domain or not in the problem domain, and wherein if the distinguisher determines the input sample is an adversarial input
    generating a random output value;
    smoothing the random output value to reduce a difference between the random output value and the first output from the first machine learning model; and
    providing the smoothed random output value instead of the first output.

10. The method of claim 9, wherein determining if the first input sample is an adversarial input further comprising:
    training a plurality of machine learning models, each of the plurality of machine learning models derived from the first machine learning model, wherein the plurality of machine learning models each having a predetermined difference from the first machine learning model;
    providing a plurality of second outputs from the plurality of machine learning models;
    aggregating the plurality of second outputs to determine a final output; and
    classifying the final output to determine if the first input sample is an adversarial input, wherein if the first input sample is in a problem domain and the first output and the final output are in the problem domain, the first input sample is determined to not be an adversarial input, and if the first input sample is not in the problem domain, the first output is in the problem domain, and the final output is not in the problem domain, the first input sample is identified as being an adversarial input.

11. The method of claim 10, wherein aggregating the plurality of outputs further comprises determining that the final output is decided by a majority vote of the plurality of machine learning models.

12. The method of claim 10, further comprising training the first machine learning model, wherein training the plurality of machine learning models and the first machine learning model occurs concurrently, and wherein the first machine learning model and the plurality of machine learning models are trained using different training input samples.

13. The method of claim 10, wherein training the plurality of machine learning models further comprises training the plurality of machine learning models using a data set used to train the first machine learning model.

14. The method of claim 9, wherein the random output value is pseudo-randomly generated.

15. A non-transitory machine-readable storage medium encoded with instructions for hardening a machine learning model against extraction, comprising:
    instructions for training a first machine learning model with a first data set to provide a trained first machine learning model having a first accuracy;
    instructions for training a plurality of machine learning models, each of the plurality of machine learning models derived from the first machine learning model and having a second accuracy less than the first accuracy;
    instructions for providing, during inference operation, a first input sample to the first machine learning model and to each of the plurality of machine learning models, wherein in response to receiving the first input sample, the first machine learning model providing a first output and the plurality of machine learning models providing a plurality of second outputs;
    instructions for aggregating the plurality of second outputs to determine a final output;
    instructions for classifying, with a distinguisher, each of the first output and the final output as problem domain or non-problem domain;
    wherein if the final output is determined to not be in the problem domain, and the first output is determined to be in the problem domain, the first input sample is identified as being an adversarial input; and
    instructions for providing a randomly generated output in response to the first input sample being identified as an adversarial input, otherwise providing the first output.

16. The non-transitory machine-readable storage medium of claim 15, wherein aggregating the plurality of outputs further comprises determining that the final output is decided by a majority vote of the plurality of machine learning models.

17. The non-transitory machine-readable storage medium of claim 15, wherein classifying the final output to the first output further comprises comparing the final output to the first output, if the first input sample is in a problem domain and the first output and the final output are in the problem domain, the first input sample is determined to not be an adversarial input sample, and if the first input sample is not in the problem domain, the first output is in the problem domain, and the final output is not in the problem domain, the first input sample is identified as being an adversarial input.

18. The non-transitory machine-readable storage medium of claim 15, wherein training the first machine learning model and training the plurality of machine learning models occurs concurrently, and wherein the first machine learning model and the plurality of machine learning models are trained using different training input samples.

19. The non-transitory machine-readable storage medium of claim 15, wherein the randomly generated output is pseudo-randomly generated, and the method further comprising smoothing the pseudo-randomly generated output to reduce a difference in values between consecutive randomly generated outputs.

* * * * *